Patented Mar. 6, 1945

2,371,050

UNITED STATES PATENT OFFICE 2,371,050

ORGANO-SILICON POLYMERS AND METHOD OF MAKING THEM

James Franklin Hyde, Corning, N. Y., assignor to Corning Glass Works, Corning, N. Y., a corporation of New York No Drawing. Application August 19, 1940, Serial No. 353,302

12 Claims. (Cl. 260—2)

This invention relates to organo-silicon compounds and polymers thereof, and to the use of such polymers in the production of protective coatings, plastics, impregnating agents, and fillers for fabrics and fibrous materials.

The present application is a continuation-in-part of my co-pending application Serial Number 318,373, filed February 10, 1940.

As is well known, there is no single material available which could meet all of the requirements of the numerous applications of resinous materials in industry. There is consequently a continual need for new resins or plastics, which are more suited to present applications or which may be adaptable to new applications that arise. By way of example, there has long been a need for a flexible electrical insulating medium which can be used in very thin layers and which will withstand relatively elevated temperatures without substantial deterioration in flexibility and electrical characteristics. Cotton, silk and paper fabrics decompose with charring at relatively low temperatures. Asbestos, which has the requisite temperature resistance for many electrical applications, must, because of its lack of mechanical strength, be employed in greater thickness than organic insulations. The recently developed fabrics of glass fibre on the other hand are thin and flexible and yet have a very high tensile strength and all the valuable electrical properties of glass. They will successfully withstand temperatures above 500° C. without impairment of their electrical properties and up to about 350° C. without substantial loss of their original flexibility. Although the dielectric strength of glass per se is high, that of the fabric made therefrom is no higher than the dielectric strength of the air filling the voids and spaces between the fibres. Therefore, the use of an impregnating dielectric medium is essential for displacing the interstitial air. The temperature at which glass fabrics can be employed for electrical purposes has been limited by the relatively low decomposition temperatures of prior impregnating materials. Prior heat resisting resins become brittle and charred when subjected to temperatures in excess of about 150° C. The electrical characteristics of the impregnated fabric are thereby seriously impaired. The windings of motors, dynamos, transformers, electromagnets and other electrical equipment employing coils or covered conductors consequently have been objectionably bulky and they could not be built to operate efficiently at elevated temperatures. As will be seen the properties of some of the new polymers make them especially valuable for electrical insulating purposes.

The primary object of this invention is the production of organic polymers which contain a large percentage of chemically combined silicon, are stable throughout a wide range of temperatures and vary in properties from viscous liquids, through rubbery flexible solids to hard brittle masses.

Another object is to produce resinous organic polymers which will be flexible and electrically insulating throughout a wide range of temperatures, which will not decompose at temperatures from 50° C. to 100° C. higher than the decomposition temperature of the best prior resins and which will not form charred or carbonaceous residues at temperatures above this.

The above and other objects may be accomplished by practicing my invention which comprises, among its features, resinous organic polymers which contain chemically combined silicon equivalent to at least 20% $SiO_2$.

More specifically, the invention comprises a condensation polymer of a silicone, the average molecular structure and composition of the polymer corresponding to a plurality of heterocyclic groups of alternate silicon and oxygen atoms, each silicon atom being attached to at least one carbon atom, the groups being joined by silicon-oxygen-silicon linkages.

Another feature of the invention comprises resinous polymers of similar structure containing at least four of the said heterocyclic groups.

The invention further includes methods of preparing the polymers.

The new polymers are prepared by the hydrolysis and dehydration with heat of a disubstituted organic-silicon compound alone or in the presence of a mono-substituted organo-silicon compound. Various starting materials can be employed, such as silicon tetrachloride and ethyl orthosilicate. For economic reasons I prefer to use silicon tetrachloride and the following description shows by way of example the preparation of resinous polymers therefrom. In general the starting material is converted to a silicone having the general formula $(R_2SiO)_n$, where R is either an alkyl or aryl radical, either or both of which may be present. These silicones, as will later appear, are polymeric and have a heterocyclic structure consisting of a ring of alternate silicon and oxygen atoms with two R groups attached directly to each silicon atom through silicon-carbon linkages. I have found that by means of oxidation and/or hydrolysis some of the alkyl or aryl radicals, or both, as desired, can be displaced by oxygen and a plurality of the heterocyclic groups can be joined by the silicon-oxygen-silicon linkages thus provided, thereby forming new and useful products of high stability.

As an example, the polymerization of phenyl ethyl silicone will be described. This compound may be prepared from silicon tetrachloride by a series of steps involving first the Grignard reaction:

(1) $SiCl_4 + EtMgBr \rightarrow EtSiCl_3 + MgBrCl$
(2) $EtSiCl_3 + PhMgBr \rightarrow PhEtSiCl_2 + MgBrCl$ In carrying out these reactions it is preferable to add the Grignard reagents slowly in order to maintain the silicon chloride in excess during the reaction, thereby discouraging the formation of trisubstituted and tetra-substituted compounds. After completion of each reaction the precipitated magnesium salts may be filtered out and the ether or other solvent in which the reaction was conducted may be separated by distillation. If desired, the product of each reaction may be further purified by fractional distillation under reduced pressure. However, it is advantageous to omit the intermediate purification and in fact the two reactions may be carried on simultaneously in the same reaction mixture provided the two Grignard reagents can be mixed without co-reaction, as in the present instance. The disubstituted silicon dichloride thus obtained may be purified by fractional distillation, but it is advantageous to use the crude product because for some purposes at least the presence of small amounts of other substitution products is unobjectionable and it has been found that the mono-substituted compound, if present, may beneficially take part in subsequent reactions, as will later appear. In order that the invention may be more clearly set forth, the reactions of the purified disubstituted material will first be considered.

The disubstituted silicon dichloride is converted to the corresponding silicane diol by hydrolysis and from this the silicone, sometimes called the anhydrosilicane diol, is formed by dehydration.

(3) $PhEtSiCl_2 + 2H_2O \rightarrow PhEtSi(OH)_2 + 2HCl$
(4) $2PhEtSi(OH)_2 \rightarrow 2PhEtSiO + H_2O$ The two reactions probably occur consecutively but appear to take place together. The reactions are carried out by slowly mixing an excess of water with the disubstituted silicon dichloride. The residual water and the hydrochloric acid formed during the reaction can be separated by means of a separatory funnel and, if desired, the last traces may be evaporated under vacuum.

In like manner a variety of silicones may be prepared containing various alkyl and/or aryl radicals including alkaryl radicals, heterocyclic radicals and other complex alkyl or aryl radicals which may be linked by a carbon atom to a silicon atom to form the silicone. In addition to the above described silicone I have also prepared in like manner diphenyl-, dimethyl-, diethyl- and dibutyl-silicone. These, when treated by the methods to be described, undergo similar physical changes and yield polymerization products similar in structure to those obtained from phenyl ethyl silicone. It should be pointed out here that although the physical characteristics of the polymerization products appear to depend largely on structure and extent of polymerization, the nature of the groups do have some effect. Thus, at a certain advanced stage the products from alkyl silicones are quite flexible and rubbery, while those from diphenyl silicone, for example, at a similar stage are quite hard with a tendency to be brittle. The comparable product from phenyl ethyl silicone is intermediate. The silicones are in general either crystalline compounds or oily substances of varying viscosities at room temperature.

It is unlikely that the silicones can exist in a monomeric form, because there is no proof that a double bond can exist between silicon and oxygen. My researches show that the silicones here contemplated are heterocyclic and trimeric and have the general structural formula:

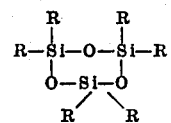

R being an alkyl or aryl radical including alkaryl and heterocyclic radicals. For example, the trimer of phenyl ethyl silicone,

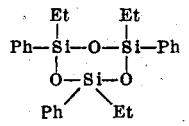

has a theoretical silica content of 40% and a molecular weight of 450. A sample of the product of Equation 3 above, from which the excess water and hydrochloric acid had been removed, was brought to constant weight under a vacuum at room temperature and the silica was determined by decomposition of the sample with a mixture of sulfuric and nitric acids followed by strong ignition of the residue. A silica content of 40.3% was obtained. A determination of the molecular weight of a similar dehydrated sample by the melting point method of K. Rast, as described in the book entitled "Quantitative Organic Microanalysis" by F. Pregl, 3rd Edition Blackiston, page 237, yielded the result 445. Such close agreement between theory and experiment is strong evidence of the trimeric structure of the silicones.

Polymerization, as stated above, is accomplished by the displacement of an organic radical from one or more of the silicon atoms of the trimeric heterocyclic group above referred to and the formation of oxygen linkages between silicon atoms of adjacent groups whereby two or more of the said groups are joined. Such polymerization results in stable compounds, the molecular weights and viscosities of which depend upon the extent of polymerization. The lower polymers, that is, those consisting of two or three of the said groups, being in general oily liquids and the higher polymers being increasingly viscous and resinous in character. In polymerizing the silicones radicals may be displaced by oxidation or hydrolysis with application of heat. Alkyl radicals are suitably displaced by oxidation and aryl radicals by hydrolysis, preferably aided by a catalyst such as hydrochloric acid alone or in combination with a small amount of ferric chloride, aluminum chloride or zinc chloride. The two types of reaction may be carried on simultaneously to displace both alkyl and aryl radicals at the same time.

For example, in order to polymerize phenyl ethyl silicone by displacing alkyl radicals, I heat it at about 200°–300° C. and at the same time bubble air through it. The evolution of acetaldehyde indicates that ethyl radicals are being removed and that oxidation is taking place. The viscosity of the liquid increases, which indicates that the size of the molecules is increasing or, in other words, that a polymerization is occurring. With a silicone having the heterocyclic trimeric structure above referred to, the reaction may be represented as follows:

(5)

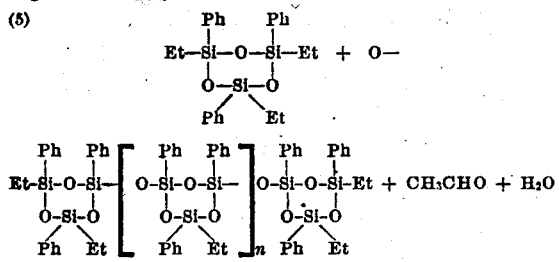

The viscosity further increases as the reaction is continued and at the end of several hours at the above noted temperatures the material has become highly viscous and sticky. At higher temperatures the reaction will proceed faster and less time may be required to attain high viscosity but appreciable loss by volatilization of the initial silicone may be incurred before polymerization can take place. When the material has attained the sticky, viscous stage, it is still soluble in toluene and like solvents, and is heat-convertible. Hence its molecular structure is believed to be largely at least of the chain type shown in Equation 5. If the viscous mass is further heated with access of air, it will harden to a flexible non-tacky resinous substance which is infusible and insoluble. Such change in properties is believed to be caused by the formation of cross linkages or side chains arising from the removal of ethyl groups from the sides of the chain structure of Equation 5 and the substitution of oxygen therefor, whereupon cross linkages of Si-O-Si to side chains occur. It is also possible that the change in properties is due to a closing of the chains to form cyclic polymers of high molecular weight. This is in accordance with the theory that open chain polymers are fusible and soluble and the introduction of cross chains results in infusibility and insolubility. In the above reaction for the removal of alkyl groups by oxidation, it is believed that the aryl groups are substantially unaffected. Alkyl groups may also be removed by other oxidizing reagents.

As an example of the polymerization of a silicone by removal of aryl groups and formation of Si-O-Si linkages, I heat phenyl ethyl silicone at about 170°–180° C. and at the same time slowly add thereto water and a catalyst such as aqueous hydrochloric acid dropwise. The inclusion of a trace of ferric chloride into the acid increases the speed of reaction. Benzene is evolved and the liquid becomes increasingly viscous, indicating that phenyl radicals are removed and that polymerization is occurring through the formation of Si-O-Si linkages. Here again with a silicone having the heterocyclic trimeric structure, the reaction may be represented as follows:

(6)

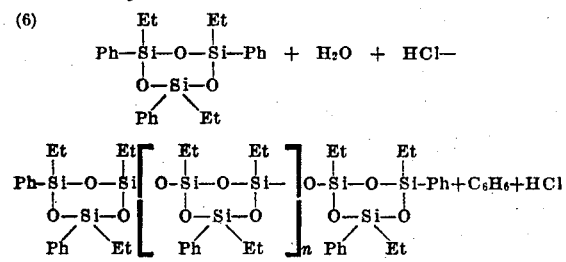

Continued heating at about 170°–180° C. with continued addition of aqueous hydrochloric acid will after a few hours bring the material to a sticky, viscous state, in which state it is still soluble in toluene and other solvents and is heat-convertible. Further heating, preferably at higher temperatures, converts it to a flexible, non-tacky resinous substance which is infusible and insoluble. When ferric chloride is used as a catalyst the time required for the polymer to attain the insoluble state is greatly shortened. Here also it is believed that the heat-convertible stage is characterized by a chain structure, such as that represented in Equation 6, and that the infusible and insoluble stage is characterized by the additional formation of a cross chain structure or, perhaps, closed chains, brought about by additional Si-O-Si linkages. Although it is possible that some alkyl radicals also may split off during the above described treatment with aqueous hydrochloric acid, it is believed that the aryl groups are predominently affected, because the product more closely resembles those obtained from the alkyl silicones, which appear to be more rubbery with less tendency to be hard and brittle, than the product from an aryl silicone polymerized to a similar extent.

Both alkyl and aryl radicals may be removed by a combination of reactions represented in Equations 5 and 6 and, as polymerization proceeds, the product becomes increasingly viscous until it attains the sticky, viscous state just short of insolubility after which, with further heating, it becomes a flexible, non-stick, insoluble, infusible resinous substance. It is believed that here also the partially polymerized state representing the approximate limit of chain polymerization is characterized by a molecular structure which is a combination of those shown in Equations 5 and 6. Such a combination of reactions is carried out most simply by heating an aryl-alkyl silicon dichloride, for example, phenyl ethyl silicon dichloride, at about 170°–180° C. for several hours and passing moist air into and through the liquid. Presumably, hydrolysis and dehydration occur, as shown in Equations 3 and 4, and the silicone is formed, but at the same time ethyl radicals are removed by oxidation, as shown in Equation 5, by the oxygen of the air which is being passed in, and phenyl radicals are removed by hydrolysis, as shown in Equation 6, by the aqueous hydrochloric acid according to Equations 3 and 4.

Another method of removing both alkyl and aryl radicals simultaneously is to treat the silicone with nitric acid. The acid removes alkyl radicals by oxidation and at the same time removes aryl radicals by nitration, nitrobenzene being evolved as a by-product.

When ethyl orthosilicate is used as a starting material, the procedure outlined above for silicon tetrachloride is used and the reactions which occur are similar to those noted for the latter material.

Dialkyl or diaryl silicon compounds are also prepared by the foregoing methods. For example, when dimethyl-diethoxy silicon is hydrolyzed with an excess of water and air is bubbled through the resulting silicone while the latter is heated at about 200°–250° C., a viscous, soluble, heat-convertible product is obtained which, on continued heating, is converted to an insoluble, infusible but flexible resinous substance. Hydrolysis and dehydration take place as follows:

(7) $(CH_3)_2Si(OC_2H_5)_2 + 2H_2O \rightarrow$
$(CH_3)_2Si(OH)_2 + C_2H_5OH$ (8) 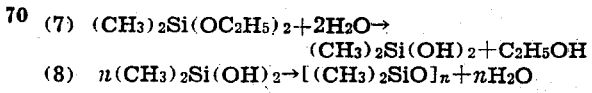

The reaction according to Equation 8, to some extent at least, occurs simultaneously with the reaction represented in Equation 7 and further condensation and dehydration of the silicol takes place upon the application of heat to produce the silicone as a liquid having the above described heterocyclic structure comprising groups of alternate silicon and oxygen atoms. When air is passed through the heated silicone, some of the methyl radicals are oxidized to formaldehyde and replaced with oxygen atoms which form siloxane linkage between heterocyclic groups, thus:

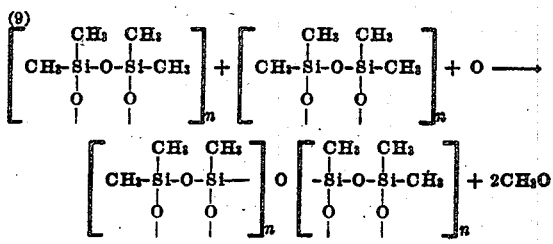

Diphenyl silicon dichloride, on being heated to about 170°–180° C. and having moist air bubbled through is likewise converted to a soluble, heat-convertible product which, on further heating at higher temperatures, changes to an insoluble, infusible resin of similar structure but hard and brittle.

The stage at which the material is highly viscous and sticky but is still soluble in toluene and other solvents is believed to mark the approximate limit to which polymerization with chain structure can be carried and the approximate point at which extensive formation of cross linkages begins. Hence, if it is desired to obtain the largest possible molecules while retaining solubility and heat-convertible characteristics, it is necessary to continue the polymerizing treatment as long as possible without causing the product to become insoluble. The progress of the polymerization may be readily observed by removing a small portion of the product with a glass rod from time to time as the polymerization proceeds and cooling it and observing its characteristics and solubility. It is characteristic of the new compounds in the sticky, viscous yet soluble state representing the approximate limit of chain polymerization that they are substantially free from objectionable flow at temperatures suitable for curing when applied in solution for coating or impregnation.

The experimental results of analysis and molecular weight determination indicate that the structure of the new compounds at the soluble, heat-convertible stage in their polymerization consists of molecular chains comprising an average of four of the trimeric heterocyclic groups above referred to and that the average value of $n$ in Equations (5) and (6) is at least 2. For example, a polymer produced from phenyl ethyl silicone by the polymerization thereof with aqueous hydrochloric acid and with substantial absence of air according to Equation (6) to a sticky, viscous state just short of insolubility showed on analysis a silica content of 49.5% $SiO_2$ and a carbon content of 50.6% C. A determination of the average molecular weight by the method referred to above yielded the result 1310. These results are reasonably close to the theoretical values of 51.9% $SiO_2$, 51.9% C and 1386 molecular weight for the polymer shown in Equation 6 with $n$ equal to 2. For a polymer having the structure shown in Equation (5) with $n$ equal to 2, the corresponding theoretical values are 43.0% $SiO_2$; 60.2% C and 1674 molecular weight.

As pointed out above, the subsequent further polymerization results in a probable increase in the size of the molecule through the inclusion therein of additional trimeric heterocyclic groups. The determination of the molecular weight of the final insoluble resin would be extremely difficult, if not impossible, and hence the number of such groups comprising the final resin cannot be stated but is at least four.

By conducting the polymerization for shorter lengths of time than that required to produce the tetra-cyclic polymer described above, by-cyclic and tri-cyclic polymers consisting on an average of two and three of the heterocyclic groups respectively can be produced. Viscosity measurements made periodically during the polymerization of phenyl ethyl silicone up to the tetra-cyclic stage when plotted against time gave a smooth curve. This indicates that the viscosity does not change abruptly with the transition of the material from the bicyclic to the tricyclic or from the tricyclic to the tetracyclic polymer. Consequently the viscosity cannot be used as an accurate indication of the exclusive presence of either of the lower polymers. However, polymerization can be stopped at any intermediate stage and the products thereof are useful viscous liquids, which correspond to the lower stages of polymerization as regards average molecular weight and silica content.

In the above described processes for producing the new compositions from disubstituted organosilicon compounds, some of the radicals are removed leaving the product to some extent monosubstituted. Thus it is seen that in the structural formulas of the polymerized products shown in Equations 5 and 6 and 9 the heterocyclic groups constituting the end groups of the compounds each contain two disubstituted silicon atoms and one monosubstituted silicon atom, while the heterocyclic groups constituting the intermediate groups each contain one disubstituted and two monosubstituted silicon atoms. I have found that when a mixture of mono- and disubstituted silicon chlorides is hydrolyzed copolymerization may occur, and in some instances with the proper proportions resins similar in behavior and properties to those from the corresponding pure di-substituted silicon compound have resulted. For example, I have found that phenyl silicon trichloride and phenyl ethyl silicon dichloride in the proportions of one part of the former and two parts of the latter, when hydrolyzed by water and heated at about 170° C. in accordance with the procedure set forth above, will produce in a shorter time a viscous heat-convertible polymer of substantially the same properties as is obtained by the like treatment of phenyl ethyl silicon dichloride alone. It is believed that the dehydration of the mixture of intermediate hydroxyl compounds takes place in a random manner resulting in the joining of some monosubstituted silicon atoms and disubstituted silicon atoms. Thus chains of heterocyclic rings may be formed similar to the definitely spaced groups above described, although it is improbable that such fixed spacial relations of mono- and disubstituted silicon atoms could be duplicated from the mixture. The relative ease of dehydration of the compounds to be mixed, which is found to be somewhat affected by the nature of the organic groups, appears to be a definite factor in determining the course of the dehydration. It can be seen here that the extent of polymerization will depend more on the mere splitting out of water by heating and less on the removal of groups by hydrolysis depending upon the relative proportions of mono- and di-substituted material respectively. Thus, as in the example just cited the use of crude phenyl ethyl silicon dichloride containing phenyl silicon trichloride is not disadvantageous. In general, harder more brittle resins are more readily produced in this manner, since they are more readily carried beyond the flexible rubbery stage. Hence, resins more adaptable to use in plastic compositions may result by this method since further polymerization to a harder stage depends largely on heating to cause dehydration.

The new resins may be used for various purposes. For example, they are excellent coating and impregnating agents, particularly in the fabrication of electrical insulating materials, because in their intermediate form they can be dissolved and applied in the form of solutions for the impregnation of various fibrous materials and thereafter can be polymerized to complete insolubility and infusibility. In the latter state they have rubber-like characteristics and good electrical properties at room temperature, all of which are retained at temperatures above those at which prior resins break down and deteriorate. The new resins are relatively non-flammable and do not leave a carbonaceous residue when decomposed.

In making use of the new resins for impregnating tapes and other fibrous materials for electrical insulation the polymerization is carried out until the material has attained the sticky, viscous state just short of insolubility, after which it is cooled and dissolved in toluene or other solvent. The solution is applied by dipping, brushing or spraying, followed by evaporation of the solvent. Several applications of the solution may be required to produce a coating of sufficient thickness. When the solvent has completely evaporated the coated article is baked for several hours at a temperature from 200°–300° C. until the resin is tack-free. With the phenylethyl silicon resin of Equation 6, this condition is attained by baking for about 36 hours while the temperature is slowly raised from about 200° C. to about 260° C. Other silicon resins within the scope of my invention may require different temperatures and times, but such conditions are readily determined by trial.

Comparative tests have shown that at normal temperatures the above described resins are equally as good as the average of prior resins and impregnating media with respect to flexibility and electrical characteristics in general and are superior with respect to power factor loss. At higher temperatures the new resins are superior in that they retain their flexibility and electrical properties long after the prior materials have failed.

For example, glass cloth approximately .005 inch in thickness, which has been impregnated with the phenylethyl silicon resin of Equation 6 and cured as above described, has an average electrical resistance of about 600 megohms per square inch at a temperature of about 40° C. and a relative humidity of 90%, using 225 volts D. C. Under the same conditions three typical 10 mil commercial varnished cloths had an average electrical resistance of 285, 395 and 50 megohms per square inch respectively.

The average dielectric strength of the glass cloth impregnated with the new resin is about 1500 volts per mil. Samples of such impregnated glass cloth were further heated at about 260° C. for about 48 hours with no substantial change in flexibility being apparent. At a temperature of about 200° C. similar samples were heated for nearly three weeks without substantial change in flexibility. The first apparent change in the new resins upon such drastic heat treatment is a general whitening thereof which always occurs before the flexibility is affected. There is no apparent carbonization. After being heated for six days at about 240° C., the dielectric strength of such samples is still in excess of 1000 volts per mil.

Similar glass cloth which has been impregnated with the best of prior heat resisting varnishes becomes blackened and brittle when heated for 24 hours at about 180° C.

Power factor tests gave the following results: A sample of glass cloth impregnated with phenylethyl silicon resin, which had been cured at about 230° C. for about 64 hours, had a power factor of 0.74% and dielectric constant 3.22 when tested with a 60 cycle alternating current at 500 volts in a relative humidity of 39% at a temperature of 25° C. The same sample when tested at a frequency of 1 megacycle at 21° C. had a power factor of 0.90% while the dielectric constant was unchanged. Another similar sample which in addition to being cured at 230° C. for 64 hours, was subsequently heated continuously for 600 hours at about 200° C. had after the heat treatment a power factor of 0.91% at 60 cycle frequency and 0.42% at a frequency of 1 megacycle, the dielectric constant being 3.2 in each instance. In contrast to these results a piece of glass cloth impregnated with one of the best of the prior heat resisting varnishes had a power factor of 2.2% at a frequency of 1 megacycle.

The new resins adhere well to glass under both dry and wet conditions. It was found therefore that the impregnation of glass fibre yarn with the new resins increases the flexing endurance of the yarn many fold. In performing the test, the yarn was flexed over a freely rotatable steel mandrel one-eighth inch in diameter at a tension of three-fourths of a pound. Breakage of the yarn constituted failure. The test was performed first by using dry yarn and then by pouring water on the yarn while flexing it over the mandrel. With dry, untreated yarn from 700 to 1000 flexes could be obtained, but when wet with water, the untreated yarn withstood only 30 to 40 flexes before failure. When the yarn was previously impregnated with the phenylethyl silicon resin of Equation 6, from 2000 to 3000 dry flexes and from 650 to 1200 wet flexes were obtained before failure. When the yarn was impregnated with dimethyl silicon resin, 1600 to 1700 dry flexes and 600 to 800 wet flexes were obtained.

The high degree of flexibility of the new resins when properly cured, and their ability to retain their flexibility and electrical properties at temperatures above 200° C. for extended periods of time makes them particularly suitable as coatings per se on wire in lieu of the prior enamels and varnishes employed for coating magnet wire and the like.

Tests have shown that the phenylethyl silicon resin will withstand immersion for fifteen minutes in a standard transformer oil heated at 100° C. without flaking or disintegration or loss of dielectric strength. Under such conditions the commonly used prior resins fail. Consequently, fabrics impregnated with the new resins are suitable for use under conditions involving not only elevated temperatures but also contact with oil and grease such as are encountered by brake linings for automotive vehicles and the like.

What is claimed is:

1. A condensation polymer of phenylethyl silicone containing silicon equivalent to at least 43% $SiO_2$ by weight and not more than 61% of carbon and having an average molecular weight above 1300.

2. A condensation polymer of phenylethyl silicone which contains silicon equivalent to about 50% $SiO_2$ by weight, has an average molecular weight between 1300 and 1400 and is soluble and heat-convertible.

3. The method of making an organo-silicon polymer which includes heating a disubstituted silicon dichloride of the type $RR'SiCl_2$, where R is an alkyl hydrocarbon radical and R' is a phenyl radical, at about 170° to 180° C., while introducing water and air until the material becomes viscous and heat-convertible.

4. The method of preparing new synthetic compositions which comprises heating phenyl ethyl silicon dichloride at about 170° to 180° C. with the addition of water and air until a heat convertible and soluble composition is obtained.

5. An organo-silicon oxide composition comprising essentially silicon atoms, oxygen atoms, and phenyl and ethyl radicals, said silicon atoms being joined together by said oxygen atoms through silicon-oxygen linkages, said phenyl and ethyl radicals being attached to silicon atoms through carbon-silicon linkages, the ratio of the sum of the phenyl and ethyl radicals to the number of silicon atoms being greater than one and less than two and the average molecular weight of said composition being above 1300.

6. An article of manufacture comprising a substantially insoluble and infusible organo-silicon oxide composition comprising essentially silicon atoms, oxygen atoms, and phenyl and ethyl radicals, said silicon atoms being joined together by said oxygen atoms through silicon-oxygen linkages, said phenyl and ethyl radicals being attached to silicon atoms through carbon-silicon linkages, and the ratio of the sum of the phenyl and ethyl radicals to the number of silicon atoms being greater than one and less than two.

7. A resinous condensation polymer of phenyl ethyl silicone having an average molecular weight above 1300 and in which the average number of phenyl and ethyl radicals per silicon atom is greater than one and less than two.

8. The method which comprises heating a composition comprising a compound having the general formula $RR'SiCl_2$ at about 170–180° C. with the addition of water and air until a heat-convertible composition is obtained, where R is an alkyl radical and R' is an aryl radical.

9. The method according to claim 8 wherein R is a lower alkyl radical and R' is a phenyl radical.

10. The method which comprises heating a composition comprising a compound having the general formula $RR'SiCl_2$ at about 170–180° C. with the addition of water and air until a heat-convertible composition is obtained, where R is an alkyl radical and R' is an aryl radical, and then baking said heat-convertible composition at a higher temperature until a substantially infusible resinous solid is obtained.

11. The method of making an organo-silicon polymer which includes heating a disubstituted silicon dichloride of the formula $RR'SiCl_2$, where R is an alkyl radical and R' is a phenyl radical at about 170–180° C. while introducing water and air until the material becomes viscous and heat-convertible, and then baking said heat-convertible material at a still higher temperature until it becomes a substantially infusible, resinous solid.

12. The method of preparing new synthetic compositions which comprises heating a phenylethylsilicon dichloride at about 170–180° C. with the addition of water and air until a heat-convertible composition is obtained, and then baking said composition at a still higher temperature until it becomes substantially infusible.

JAMES FRANKLIN HYDE.